United States Patent

Reynolds et al.

Patent Number: 6,016,695
Date of Patent: *Jan. 25, 2000

[54] TIRE UNIFORMITY TESTING SYSTEM

[75] Inventors: Dennis Allyn Reynolds, Munroe Falls; Francis J. Bormet, Tallmadge; Richard Cukelj, Strongsville; Frank R. Jellison, Canton; David W. Lees, Sr., Ravenna; Keith A. Neiferd, Norton; Christy Quinn, Doylestown, all of Ohio

[73] Assignee: Illinois Tool Works Inc., Glenview, Ill.

[*] Notice: This patent is subject to a terminal disclaimer.

[21] Appl. No.: 08/988,480

[22] Filed: Dec. 10, 1997

Related U.S. Application Data

[60] Provisional application No. 60/036,716, Jan. 24, 1997.

[51] Int. Cl.[7] .................................................. G01M 17/02

[52] U.S. Cl. ............................................................ 73/146

[58] Field of Search ................................................. 73/146

[56] References Cited

U.S. PATENT DOCUMENTS

| | | |
|---|---|---|
| 2,771,176 | 11/1956 | Clark et al. . |
| 2,781,119 | 2/1957 | Talbot et al. . |
| 2,901,085 | 8/1959 | McCoy . |
| 3,081,959 | 3/1963 | Goodwin . |
| 3,089,576 | 5/1963 | Sauer et al. . |
| 3,102,627 | 9/1963 | Acton et al. . |
| 3,221,364 | 12/1965 | Bailey et al. . |
| 3,244,575 | 4/1966 | Sabo et al. . |
| 3,346,434 | 10/1967 | Fulton . |
| 3,687,260 | 8/1972 | Willows . |
| 3,817,003 | 6/1974 | Monajjem . |

(List continued on next page.)

FOREIGN PATENT DOCUMENTS

| 2104010 | 3/1983 | United Kingdom . |
|---|---|---|

OTHER PUBLICATIONS

Exhibit 1 –photograph of a prior tire testing machine known as M–82.
Exhibit 2 –photograph of a prior tire testing machine known as FD90.
Exhibits 3–4, photographs of a prior tire testing machine known as D90.
Exhibit 5 –photograph of a prior tire testing machine known as D92.
Exhibits 6–7, photographs of a prior tire uniformity machine, Model 2D80.

(List continued on next page.)

*Primary Examiner*—Joseph L. Felber
*Attorney, Agent, or Firm*—Watts, Hoffmann, Fisher & Heinke Co.

[57] ABSTRACT

A tire uniformity testing system includes a testing station mounted on a gantry-like frame structure and an inlet conveyor located adjacent to the testing station. The inlet conveyor receives a tire and centers the tire such that its rotational axis is located at predetermined distance from the rotational axis of the testing station, and a conveyor transports the tire to the testing station. The testing station includes rotatable chuck assembly for engaging and rotating a tire which in turn is engaged by a loadwheel that generates tire uniformity data. The inlet conveyor is mechanically isolated from the testing station. The frame forming part of the testing station includes a plurality of I-beams joined together in flange abutting relationship which, in addition to producing a mechanically rigid structure, provides spaces defined between the flanges of the beams that are suitable for routing electrical wiring, pneumatic or hydraulic lines, etc. The tire uniformity machine has a width dimension that is at least 10% greater than a depth dimension and this feature coupled with an integral crane increases the accessibility and serviceability of components in the machine. A probe system is positioned between two adjacent vertical I-beams so that the bulk of the mechanism is protected and only distal ends of the probe extend into the testing region. The probes themselves include magnetic breakaway couplings which allow sensors to decouple from the ends of the probe should contact occur between a probe and a tire being tested.

25 Claims, 9 Drawing Sheets

U.S. PATENT DOCUMENTS

| | | |
|---|---|---|
| 3,837,689 | 9/1974 | Csatlos . |
| 3,849,942 | 11/1974 | Monajjem . |
| 3,914,907 | 10/1975 | Hofelt, Jr. et al. . |
| 3,987,672 | 10/1976 | Loyer ......................................... 73/146 |
| 4,023,407 | 5/1977 | Vanderzee . |
| 4,024,372 | 5/1977 | Herrmann . |
| 4,191,055 | 3/1980 | Orem et al. . |
| 4,241,300 | 12/1980 | Hayes et al. . |
| 4,458,527 | 7/1984 | McFarland et al. . |
| 4,489,598 | 12/1984 | Beebe et al. . |
| 4,576,040 | 3/1986 | Cargould . |
| 4,638,756 | 1/1987 | Collmann . |
| 4,702,287 | 10/1987 | Higble et al. . |
| 4,704,900 | 11/1987 | Beebe . |
| 4,723,563 | 2/1988 | Kane . |
| 4,785,864 | 11/1988 | Cargould et al. . |
| 4,805,125 | 2/1989 | Beebe . |
| 4,815,004 | 3/1989 | Beebe . |
| 4,846,334 | 7/1989 | Cargould . |
| 4,852,398 | 8/1989 | Cargould et al. . |
| 4,870,858 | 10/1989 | Smith et al. . |
| 4,885,936 | 12/1989 | Hayes . |
| 4,896,531 | 1/1990 | Hayes . |
| 4,976,141 | 12/1990 | Cargould et al. . |
| 5,027,649 | 7/1991 | Himmler ................................... 73/146 |
| 5,029,467 | 7/1991 | Cargould . |
| 5,052,218 | 10/1991 | Iwama ....................................... 73/146 |
| 5,067,348 | 11/1991 | Himmler et al. . |
| 5,107,702 | 4/1992 | Iwama . |
| 5,378,273 | 1/1995 | Taguchi et al. . |
| 5,390,540 | 2/1995 | Mallison . |
| 5,481,907 | 1/1996 | Chasco et al. . |
| 5,566,816 | 10/1996 | Gross et al. . |
| 5,605,215 | 2/1997 | Gross et al. . |

OTHER PUBLICATIONS

Exhibit 8 –photograph of a prior tire testing machine.

Exhibits 9–24 –photographs of a prior tire testing machine known as D70.

Eagle Picher, Akron Standard Division, product brochure submitted in its entirety, entitled "Are you really saving when you buy used Tire Uniformity Machines? Or . . . ", date unknown.

2 page product brochure of a prior tire testing machine entitled "Tire Uniformity Equipment", date unknown.

Eagle Picher, Akron Standard Division, product brochure submitted in its entirety, entitled "The Standard of the World", date unknown.

A copy of an Akron Standard product brochure entitled "Setting The Standards for the World", submitted in its entirety, date unknown.

One page advertisement showing a prior tire testing machine, Akron Special Machinery, Inc., date unknown.

One page advertisement showing a prior tire testing machine known as X75–13 TUO, Akron Special Machinery, Inc., date unknown.

Exhibits 25–28 from Kobe Steel, Ltd., drawing showing a prior tire testing machine known as PC–UXO–P2, date unknown.

Exhibitsn 29–39 from Hofmann Maschinenbau Gmbh, drawing showing prior tire testing machines, copyright 1994.

TIRE UNIFORMITY TESTING SYSTEM

This application claims benefit of Provisional application Ser. No. 60/036,716, filed Jan. 24, 1997.

TECHNICAL FIELD

The present invention relates generally to tire testing and, in particular, to an improved method and apparatus for measuring tire uniformity and using the data obtained during testing to correct some or all of the irregularities detected in the tire during the testing process.

BACKGROUND ART

In the manufacture of tires, various irregularities and variations in the dimensions in the tires can arise. For example, dimensional irregularities can arise from inaccuracies in the molding process, changes in the characteristics of the materials and compounds employed in manufacturing the tires, inaccurate centering and variations in the vulcanization process, etc. All of the possible irregularities and variations in the tires, which can arise during manufacture, either singularly or through interaction with one another, can cause eccentricity, static and dynamic unbalance in the tire, and force variation which can result in tire vibration or noise during use.

It is possible to correct many of these irregularities by first measuring the tire variations and applying various corrective actions to the tire. To measure the variations, the tire is placed in a tire uniformity inspection machine. In currently available tire uniformity inspection machines, testing is fully automatic. Tires are fed by conveyor to a test station where each tire is mounted upon a chuck, inflated to a predetermined pressure and rotatably driven at a standard speed with its tread surface in abutting contact with the circumferential surface of a loadwheel. The loadwheel is instrumented with load cells that measure forces due to the tire acting on the loadwheel in directions of interest. The data gathered during the testing process may be used to grade the tire and/or to take immediate corrective action via shoulder and tread grinders, which selectively grind rubber from regions of the tire to compensate for the variations detected during the testing process. Alternately, or additionally, the data taken during the testing cycle may be used to mark specific regions of the tire to alert the installer to an area of interest, such as an irregularity or point of high force in the tire, which will enable the installer to take corrective or compensating action during the installation of the tire onto a wheel.

In the typical tire uniformity testing machine available today, a vertically-movable lower rim is supported in the base of the machine and is mounted for movement towards and away from a fixed, motor driven spindle mounted to the top of the machine. An elaborate framework including a plurality of spaced apart columns supports the tire testing equipment as well as sensing, grinding and marking equipment. Many of the current machines when fully outfitted with a full compliment of subassemblies are very difficult to service and require great effort to convert from one tire size to another. In at least some of the currently available machines, the various subcomponents, such as grinders, sensors and marking equipment, are not well integrated because they were added to the basic structure over the course of time. Cabling for both power and control signals between the various components and a basic control panel can be very complex and difficult to troubleshoot should problems arise.

In still other testing machines, the level at which tires are tested at the testing station is well above the plant floors so as to require maintenance workers and operators to use auxiliary equipment, such as ladders or other devices, to reach componentry needing adjustment or service.

SUMMARY OF THE INVENTION

The present invention provides a tire testing system including an inlet conveyor for delivering a tire to be tested to a testing station, the testing station including a rotatable spindle assembly and a chuck assembly reciprocally movable toward or away from the spindle assembly. A loadwheel assembly is located adjacent the chuck and spindle assemblies and is movable toward or away from the tire, the loadwheel contacting the tire during testing. The inlet conveyor includes a centering station at which a tire is centered such that the rotational axis of the tire is located a predetermined distance from the rotational axis of the testing station. The inlet conveyor includes a conveyor belt that moves the tire in a linear motion into and out of the testing station. The inlet conveyor is positioned adjacent to the testing station but is supported by structure which is not part of the testing station so that the inlet conveyor is mechanically isolated from the testing station, thereby preventing disturbances affecting the inlet conveyor from being transmitted to the testing station.

The machine frame forming part of the testing station is in the form of a gantry-like structure including a base, upper cross beam, and first and second vertical columns.

In the preferred and illustrated embodiment, the base of the frame supports a movable load wheel carriage assembly, a rotatable spindle to which a tire is attached for testing. The frame defines an opening through which a tire enters the testing station and an opening through which the tire leaves the testing station. For purposes of explanation, the distance the tire travels from the entrance opening to the exit opening is termed the "depth" of the machine. The machine opening also has a "width" dimension which is a horizontal dimension transverse to the depth dimension. In the preferred and illustrated embodiment, the width dimension is at least 10% greater than the depth dimension. In a more preferred embodiment, the width dimension is substantially greater, (i.e., 50% greater) than the depth dimension. This dimensional relationship, as will be explained, provides increased accessibility and serviceability of the machine.

In the preferred and illustrated embodiment, one end of the frame defines a "V" or "Y" configuration and includes beam elements that diverge outwardly. The diverging elements forming part of the base, define mounting locations for vertical support beams which together support one end of the upper cross beam. Preferably, the opposite side of the frame is configured as a "T". The "Y" and "T" elements add structural rigidity to the frame, while allowing the "depth" dimension of the frame to be reduced.

In the preferred and illustrated embodiment, substantially the entire frame is constructed of I-beams joined to one another by suitable means such as welding. The I-beams are secured together in flange abutting relationship, the spaces defined between the flanges forming areas for routing electrical wiring, air lines, hydraulic connections, etc. The invention, however, contemplates the use of other types of beams.

According to another feature of the invention, a crane is provided to facilitate the lifting and movement of major components of the machine to a spaced location at which the component can be serviced or placed on a transport device so that it can be moved to a service location. In the illustrated embodiment, the crane comprises a vertical support hingedly connected to a vertical support column of the frame. The vertical crane support mounts a horizontal lifting beam having a lifting end and which is engageable via a cable, chain, etc. to a component that needs to be moved. In the illustrated arrangement, the crane can be used to lift and move the load wheel, the load wheel carriage, the spindle, a spindle drive motor, the chuck assembly and tire rims which form part of the chuck assembly.

To further facilitate serviceability of the machine, the major components, such as the load wheel assembly, spindle and spindle drive motor, are all located in alignment with, or to one side of, a longitudinal centerline of the frame structure. Consequently, all of the components are accessible from one side (either the entrance side or the exit side) of the machine and major disassembly of the machine in order to gain access is not required.

A probe system is also disclosed which is mounted to at least one vertical support column. In the preferred and illustrated embodiment, the probe system extends through a gap defined between adjacent support columns. Distal ends of individual probes forming part of the probe system extend into the testing station through the gap. Major portions of the probe, including servomotors and slide mechanisms, are protected by the support beams. Preferably, each probe includes a sensor which is attached to the distal end of the probe by a magnetic breakaway coupling. When unwarranted contact between a probe and components or a tire in the test station occurs, the sensor is released from the end of the probe to reduce the incidence of damage.

According to a further aspect of this feature, certain tire sensors include tilt mechanisms which enable their sensing surfaces to be tilted with respect to an area on the tire that is being sensed. A tilt sensor which responds to gravitational forces is used to monitor the tilt angle of the associated tire sensor.

A method for operating the tire uniformity testing system includes steps of advancing a tire to be tested to a centering station, centering the tire such that its rotational axis is located a predetermined distance from the rotational axis of a testing station, and advancing the tire such that its rotational axis is aligned with that of the testing station. A conveyor transports the tire to the centering station where the tire is engaged between upper and lower rotatable rims. The tire is rotated at a standard speed while engaged by the loadwheel which generates electrical signals indicative of the uniformity of the tire. After testing, the tire is advanced from the testing station by raising the conveyor into engagement with the tire and then advancing the conveyor the desired distance.

Other features, benefits and advantages of the invention will be apparent from the following detailed description of preferred embodiments taken in conjunction with the accompanying drawing figures.

DETAILED DESCRIPTION OF PREFERRED EMBODIMENTS

Figure 1:
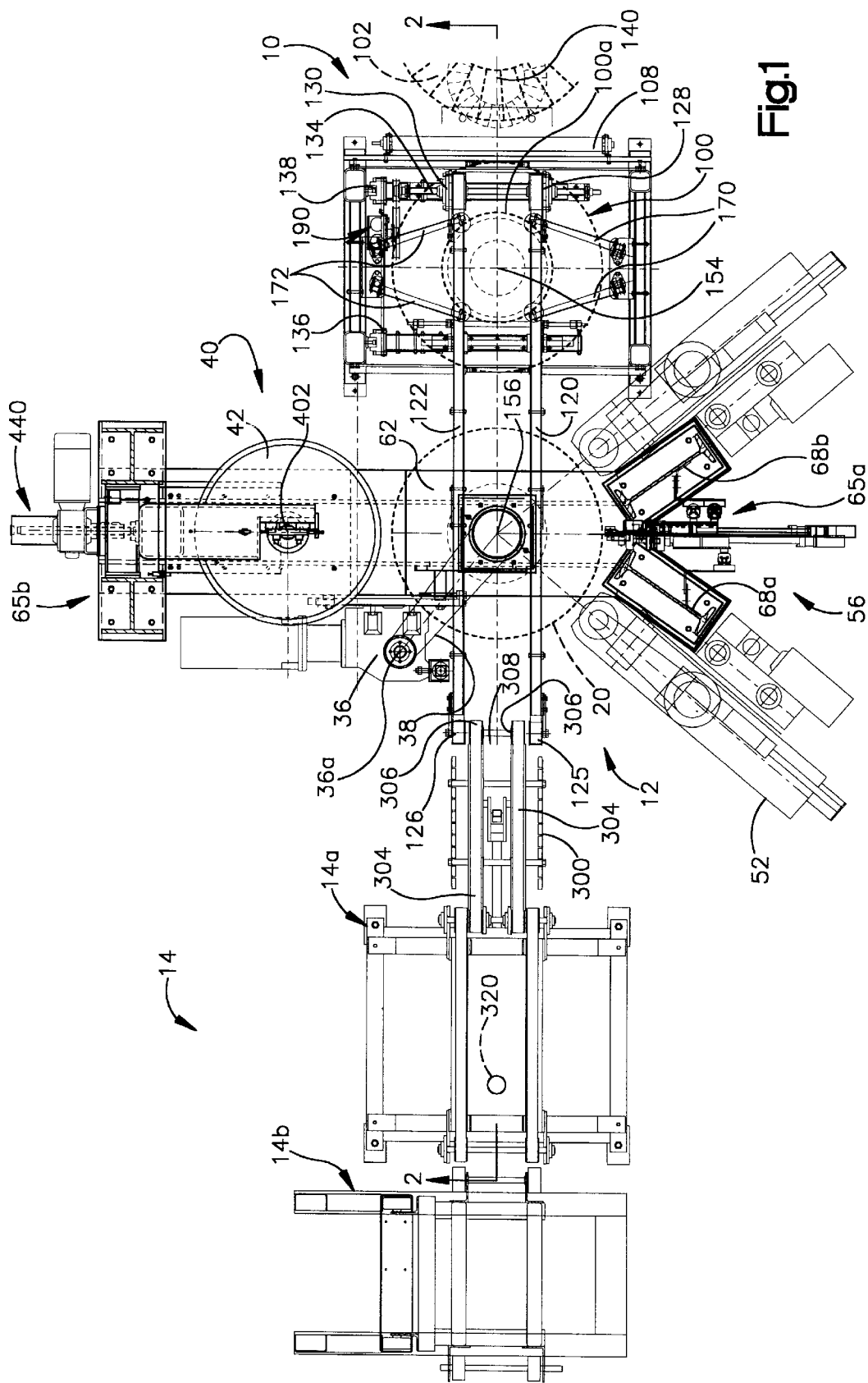
FIG. 1 is a plan view of a tire testing system embodying the present invention.

FIG. 1 illustrates, in plan view, the overall arrangement of a tire testing system constructed in accordance with the preferred embodiment of the invention. Major subsystems include an inlet conveyer 10; a testing station 12; and, an exit module 14 which may include a marking station 14a, as well as a tire sorting mechanism 14b. A tire positioned at the testing station 12 is tested and optionally ground to adjust its roundness, uniformity and/or other desired physical properties.

Figure 3:
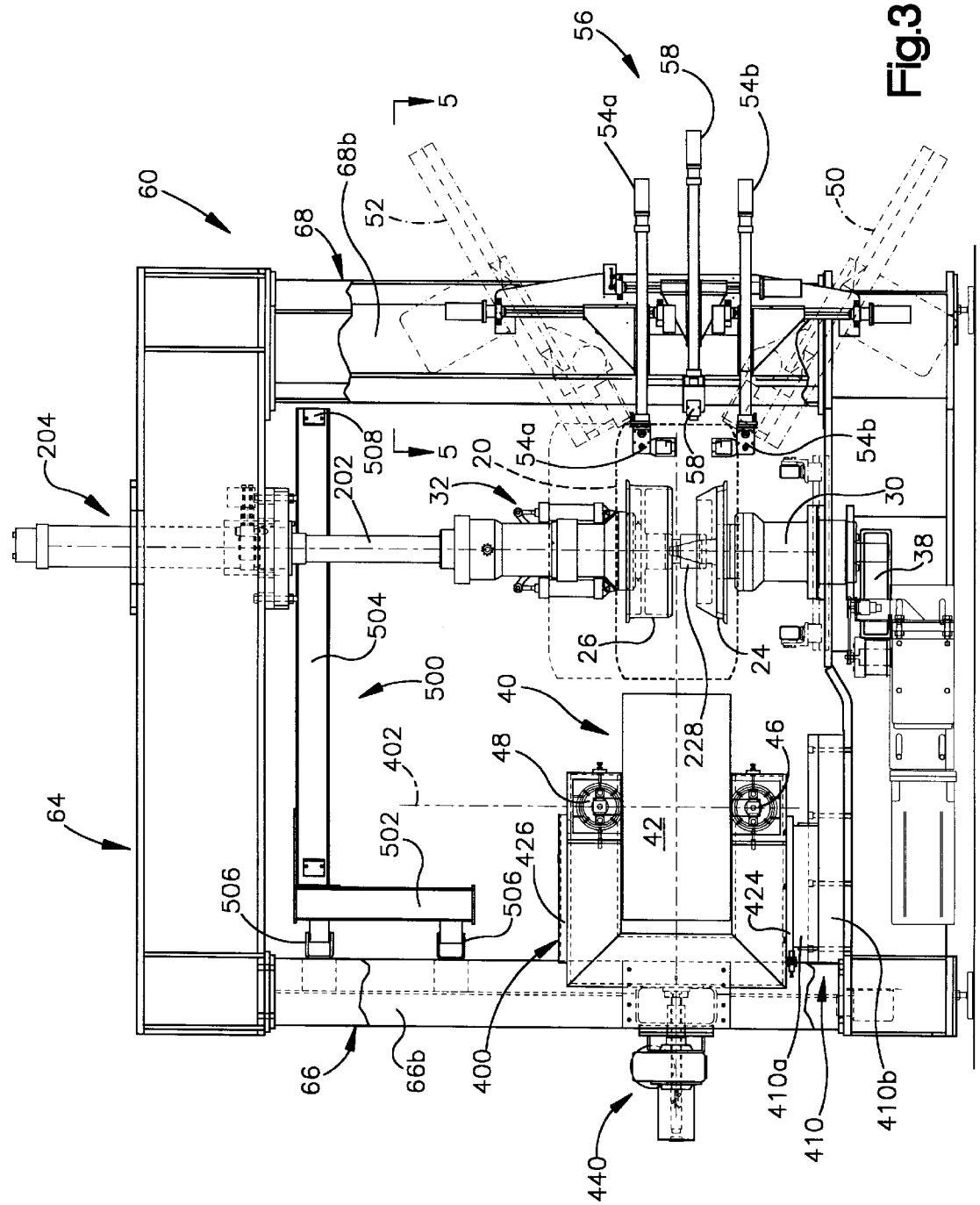
FIG. 3 is a front elevational view of a tire testing station forming part of the tire testing system shown in FIGS. 1 and 2.

Turning first to the tire testing station 12 and referring in particular to FIGS. 1 and 3, a tire, indicated in phantom by the reference character 20, is delivered to the testing location by the inlet conveyer 10 which preferably delivers the tire to a position at which an axis of the tire is coincident with a rotational axis of a pair of confronting rims 24, 26 (shown best in FIG. 3) forming part of the testing station and between which the tire 20 is clamped. The lower rim 24 (shown best in FIG. 3) is attached to and forms part of a spindle assembly 30. The upper rim 26 forms part of a reciprocally movable chuck assembly 32.

The spindle assembly 30 is rotatably driven by a drive motor 36 via a toothed belt indicated schematically in FIG. 3 by the reference character 38. After the tire is clamped between the upper and lower rims 26, 24, it is inflated by an inflating mechanism which communicates air to the interior of the tire by way of the spindle assembly 30. After inflation, a loadwheel assembly 40, including a rotatable loadwheel 42, moves into abutting engagement with the tire 20. As is conventional, the tire is rotated against the loadwheel and loads exerted on the loadwheel are monitored via load cells 46, 48 (FIG. 3). The data taken from the load cells determines the uniformity of the tire. If desired, adjustments to the uniformity are made by one or more grinders, such as the grinders indicated generally by the reference characters 50, 52 for grinding the lower and upper portions of the tire (as viewed in FIG. 3) and a grinder (not shown) for grinding the center portion of the tire.

A probe system, indicated generally by the reference character 56 may form part of the testing station and in the illustrated embodiment, as seen best in FIG. 3, includes upper and lower side wall sensor assemblies 54a, 54b, upper and lower shoulder sensors (not shown in FIG. 3) and a center tread sensor 58.

The spindle assembly 30, chuck assembly 32, loadwheel assembly 40, grinders 50, 52 and probe system 56 are mounted to a gantry-like frame system indicated generally by the reference character 60 in FIG. 3. In the illustrated and preferred embodiment, referring also to FIG. 4, the frame includes a base 62, and a cross beam 64 supported a predetermined distance above the base by pairs of columns 66a, 66b and 68a, 68b. The base 62 comprises a pair of horizontal I-beams 62a, 62b, preferably welded together to form a unitary member. In the preferred embodiment, one end 65a of the base 62 is configured as a "Y" or "V" as viewed in plan (FIGS. 4 and 5), whereas an opposite end 65b of the base 62 is configured somewhat in the shape of a "T" (FIGS. 1 and 4), the "Y" and "T" portions being joined together at the center bars of the letter formations. In particular, the "Y" end 65a of the base 62 includes outwardly angled end sections 70a, 70b which extend from respective I-beams 62a, 62b.

The "Y" configuration may be achieved by cutting off a predetermined end segment from each I-beam at a predetermined angle, e.g., 17.5°. The severed segments are then turned over and re-welded to the ends of the main portion of the beams. In this way, a "Y" configuration is achieved. The "T" configuration is obtained by welding box members 72 to the exterior sides of the end portions of I-beams 62a, 62b. A cover plate 74 (FIG. 4) is secured over the tops of members 72 and beams 62a, 62b.

The outwardly extending "V" or "Y" legs 70a, 70b of the beams 62a, 62b support the respective vertical columns 68a, 68b. Similarly, the members 72 (that form the cross bar for the "T") support a pair of vertical columns 66a, 66b. In the preferred and illustrated embodiment, the upper cross beam 64, which comprises a pair of parallel I-beams 64a, 64b welded together to form a unitary structure, spans the pairs of columns 66a, 66b and 68a, 68b. Cross plates 80, 82 are fastened to the upper ends of the column pairs 66a, 66b and 68a, 68b. The cross beam 64 sits atop, and has its opposite ends attached, for example, by welds, to the cross plates 80, 82.

In the preferred and illustrated embodiment, each vertical column 66a, 66b, 68a, 68b comprises an I-beam. As a result, the frame 60 is composed entirely of I-beams which provides an extremely rigid structure that is also easily manufactured and relatively inexpensive.

The use of a structure comprising I-beams provides additional advantages for the machine, in that the center sections (the region defined between the flanges) of the I-beams provide places for routing wiring and air lines, for making hydraulic connections, for mounting electrical and hydraulic components, etc., which adds to the aesthetic appearance of the machine, as well as provides protection for the components mounted therein.

The Inlet Conveyor

Figure 2:
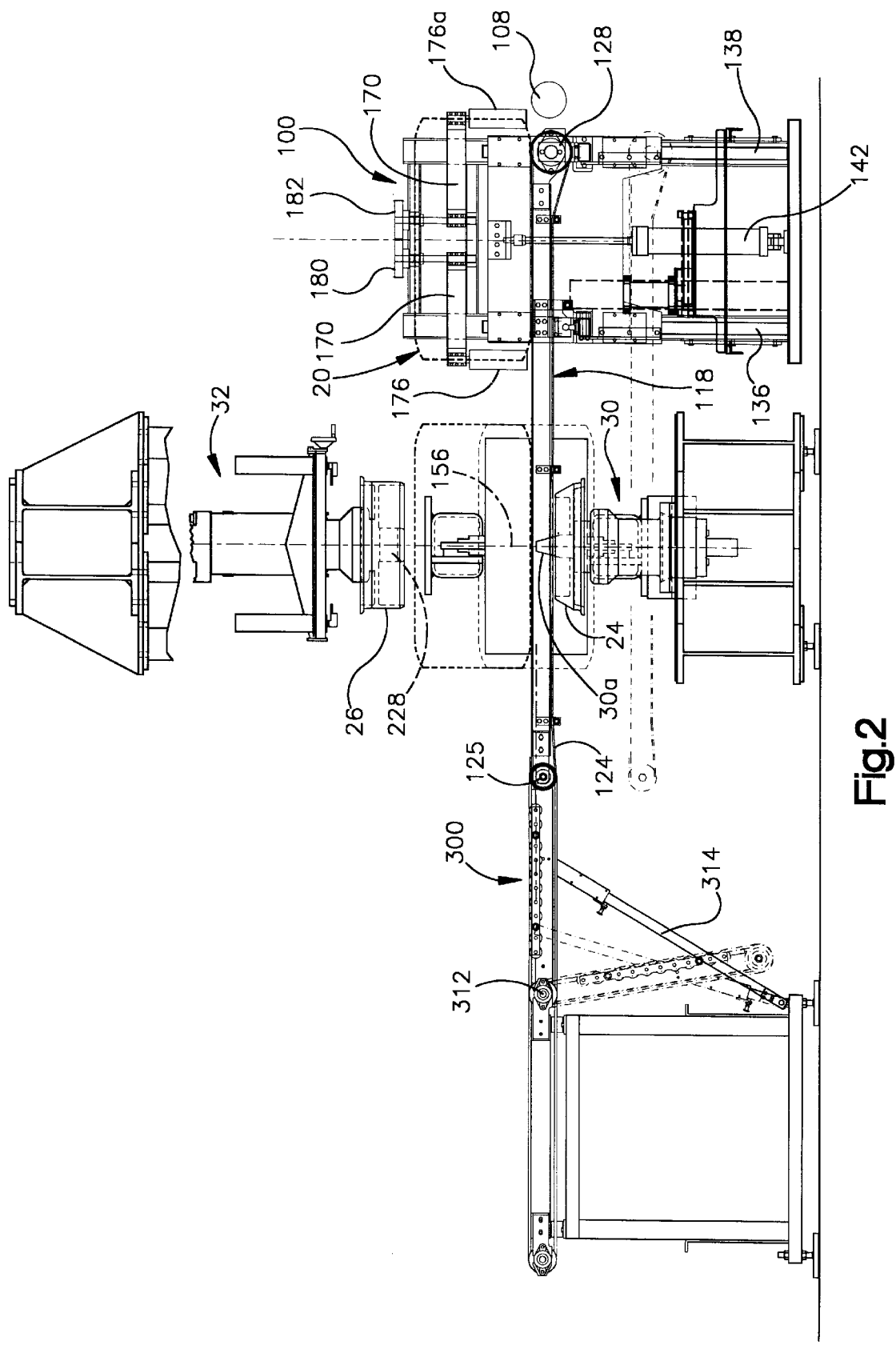
FIG. 2 is a fragmentary side elevational view of the tire testing system shown in FIG. 1.

Referring in particular to FIGS. 1 and 2, the inlet conveyor will now be described. The inlet conveyor is more fully disclosed in co-pending application Ser. No. 08/988,478, filed Dec. 10, 1997, and entitled INLET CONVEYOR FOR TIRE TESTING SYSTEMS, the subject matter of which is hereby incorporated by reference.

Inlet conveyor 10 is operative to convey tires to be tested from a centering station indicated generally by the reference character 100 to the testing station 12. In operation, a tire to be tested is delivered to the entrance of the centering station 100 by a belt or roller conveyor (not shown). FIG. 1 illustrates a tire, indicated in phantom by the reference character 102, about to be delivered to the inlet conveyor. The inlet conveyor includes a feed roll 108 which moves the delivered tire onto the inlet conveyor mechanism.

The inlet conveyor includes a four post frame unit located a predetermined distance from the testing station 12. The frame unit supports, in a cantilevered arrangement, a tire conveyor 118 (shown in FIG. 2) which comprises a pair of parallel channels or rails 120, 122 (shown best in FIG. 1) which each carry a continuous belt 124 (shown best in FIG. 2). The belts are reeved around idler pulleys 125, 126 and drive pulleys 128, 130. The drive pulleys are concurrently driven by a drive shaft 134. The conveyor mechanism (which includes the belt rails 120, 122) is supported for vertical, reciprocating motion by a pair of guides 136, 138 mounted on one side of the support frame. The belt rails 120, 122 are adjustably movable towards and away from a centerline 140 of the conveyor mechanism to accommodate tires of various widths. The conveyor mechanism is moved vertically from a lower position to an operative, conveying position by a pneumatic actuator 142 (shown best in FIG. 2).

A fixed "omni-roll" conveyor is mounted between the conveyor rails 120, 122 at the centering station and is indicated generally by reference character 100a in FIG. 1.

In operation, a tire is delivered to the centering station by the kick roller 108. The delivered tire is then centered with respect to an axis indicated by the reference character 154. In the preferred embodiment, the centering axis 154 is located a fixed distance from a test station axis 156 (FIGS. 1 and 2), which in the preferred embodiment is the rotational axis of the spindle assembly 30. Accordingly, after a tire is centered at the centering station 100, a predetermined movement in the conveyor belts 124 will deliver the tire in alignment with the spindle assembly. With this arrangement, the distance through which the tire is moved from the centering station to the test station is the same for all tires regardless of diameter.

As best seen in FIG. 1, a tire positioned in the centering station 100 is centered by a mechanism which includes pairs of pivotally mounted arms 170, 172 that are mounted to the conveyor support frame on either side of the centerline 140. Referring also to FIG. 2, each arm of a pair mounts a vertically oriented roller 176. There are four arms and four rollers that are part of the centering mechanism. The individual arms that form a pair are operatively connected by a pair of intermeshing gears 180, 182. A link arm extends across the frame structure from one gear pair to the other gear pair (not shown). The gear pair on one side of the machine is driven by a pneumatically-operated actuator that is connected to the gears and rotates the one gear through a fixed angle. Rotation of one gear produces pivotal motion of the arms 170, 172 towards and away from the tire located in the centering station 100. The arms on the opposite side of the frame move towards the tire by virtue of the interconnecting link.

Optionally, one of the center rollers, i.e., 176a in FIG. 2, is replaced by a motor driven roller which may be actuated to rotate the tire in the centering station in order to apply a lubricant to the tire 20.

In the preferred and illustrated embodiment, the conveyor drive belts are advanced by a pneumatically operated rack/pinion actuator, indicated generally by the reference character 190, which may be a Parkhann 350° rotary pneumatic (Model PTR 252-350-4-FPAB21M). When air pressure is applied to the actuator 190, rotation is produced in a drive pulley 130 (FIG. 1) which is connected to the conveyor drive shaft 134 via timing belts. The extent of rotary motion produced in the drive pulley 130 is determined by stops forming part of the rack/pinion actuator. With the disclosed actuator, a precise advancement in the conveyor belts 124 can be achieved each time the actuator is pressurized. It should be noted that because a linear actuator having a limited stroke is used to produce rotary motion, the actuator must be reversed prior to subsequent advancement of the conveyor. This reverse actuation occurs when the conveyor is in its lower position.

The inlet conveyor operates as follows. Prior to receiving a tire at the centering station, the conveyor unit is lowered by the actuator 142. A tire is driven onto the "omni-roll" conveyor by the inlet feed roll 108. Once in the centering station 100, the centering arm actuator (not shown) is actuated to drive the centering arms 170, 172 towards the tire until the rollers 176, 176a engage the tire periphery. If a luber is present, one of the centering rollers 176a is rotated in order to rotate the tire at the centering station thereby enabling the lubricator to apply a lubricant to the tire 20. At the conclusion of the centering step, the conveyor unit is raised by the actuator 142 thereby picking up the tire and, in effect, raising it above the "omni-roll" support conveyor. Each roller 176, 176a is mounted such that it can be moved vertically a predetermined distance in order to accommodate relative movement between the tire and the centering arms 170, 172 as the conveyor assembly engages and lifts the tire.

The centering arms are then moved outwardly to their retracted positions. The tire to be tested is now supported by the conveyor unit, is centered with respect to the axis 154 and is a predetermined distance from the axis 156 of the spindle 30. The conveyor actuator 190 is then actuated to advance the tire a predetermined distance which positions the tire coincident with the axis 156 of the spindle 30.

The actuator 142 is then energized to lower the conveyor unit which, in effect, lowers the tire onto the spindle 30. Normally, the conveyor would then be reverse actuated to return the drive belts to their starting positions. While the conveyor unit is in the lower position, another tire may be brought into the centering station and subsequently lubricated and centered during the time a tire is being tested at the testing station 12.

In the preferred embodiment, the distance by which the tire is advanced by the conveyor unit is the same for all size tires. This is possible because the alignment axis 154 of the centering station is a fixed distance from the rotational axis 156 of the test station. Consequently, the distance that a tire must travel (as measured from its rotational axis) is the same for all tires.

The disclosed inlet conveyor provides an effective means for delivering tires to the testing station. In the preferred unit, there is no direct mechanical coupling between the inlet conveyor system and the test station itself. Only electrical and data connections are made between the conveyor and test station. By eliminating a mechanical connection between the inlet conveyor and testing unit, vibrations, shocks, etc., that occur in the inlet conveyor system (i.e., during the centering function) are not coupled to the testing station.

The Chuck Assembly

As indicated above, a tire to be tested is held at the testing station 12 between a spindle assembly 30 fixed to the frame 60 and a reciprocally movable chuck assembly 32 mounted to a cross beam 64 of the frame 60. The spindle and chuck assemblies are more fully disclosed in co-pending application Ser. No. 08/988,119, filed Dec. 10, 1997, and entitled AUTOMATIC ADJUSTABLE WIDTH CHUCK APPARATUS FOR TIRE TESTING SYSTEMS, the subject matter of which is hereby incorporated by reference.

Referring to FIG. 3 in particular, the chuck assembly 32 is mounted to the end of a hydraulic ram 202 forming part of a hydraulic actuator 204. The actuator is secured to the frame cross beam 64 by suitable fasteners (not shown). As seen best in FIG. 4, the end of the actuator extends through an opening 220 formed in the cross beam 64 and reinforced by a plate 224. When a tire is to be tested and positioned at the testing station, the actuator 204 extends the ram 202 to move the chuck assembly 32 towards the spindle assembly 30. The chuck assembly 32 which mounts the upper tire rim 26 also includes a centrally positioned alignment member 228 which includes a tapered opening configured to receive a cone member 30a (FIG. 2) forming part of the spindle assembly 30. The alignment member 228 may be termed a "nose cone". The engagement between the alignment member 228 and the cone member 30a maintains precise alignment between the chuck assembly 32 and the spindle assembly 30 and, along with the tire clamped between the assemblies, is the means by which rotation of the spindle assembly 30 is transferred to the upper rim 26 of the chuck assembly, thereby causing upper and lower rims 26, 24 to rotate in unison when a tire is clamped between the chuck assembly 32 and spindle 30.

The Machine Exit Subsystem

After a tire 20 is tested at the testing station 12, it is delivered to a marking station 14a and/or a sorting station 14b by a transfer conveyor 300. Referring to FIGS. 1 and 2, at the conclusion of the testing cycle, the inlet conveyor is raised upwardly (to the position shown in FIG. 2) by the actuator 142. The conveyor belts 124 are advanced as described above in order to deliver a tire from the centering station 100 to the testing position, the rotational axis of which is indicated by the reference character 156. Movement of the belts 124 of the inlet conveyor 10 also moves the tire 20 located at the testing station to the transfer conveyor 300. As seen in FIG. 1, the transfer conveyor includes a pair of continuous belts 304 which are reeved around pulleys 306 that are mounted to a shaft 308. As seen best in FIG. 1, the pulleys mounted to the shaft 308 are positioned between the idler pulleys 126, 125 of the inlet conveyor, so that as a tire exits the inlet conveyor it is immediately engaged by the transfer conveyor 300. In the illustrated embodiment, the transfer conveyor 300 is pivotally movable along a pivot axis 312 (shown in FIG. 2) which is also an axis of rotation for another set of pulleys around which the transfer belts are reeved. A strut 314 (shown in FIG. 2) maintains transfer conveyor 300 in its aligned position with the inlet conveyor. When access is needed to the conveyor or the testing station, the strut is collapsed to enable the transfer conveyor 300 to rotate downwardly about the pivot axis 312.

In the illustrated embodiment, the transfer conveyor 300 delivers the tested tire to the marking station 14a. As is conventional, the marking station may be used to mark a particular region of the tire as having a particular characteristic. For example, a marking station 14a may be used to mark the location on the tire corresponding to the high point of force variation so that it can be placed in a particular orientation with respect to a wheel in order to compensate for this condition. In the preferred mode of operation, the region to be marked is determined at the testing station. At the conclusion of the test cycle, the spindle/chuck assembly is operated to orient the tire in a predetermined position so that the region to be marked is at a predetermined position with respect to the marking mechanism located at the marking station. The tire is stripped from the upper rim half. The conveyor system then engages, strips the tire from the lower rim half and transports the tire to the marking station. Since the rotational position of the tire does not change as it is being conveyed, once it is aligned with the marking station a fixed marking mechanism, indicated schematically by the reference character 320, may be actuated in order to place a desired marking on the selected region of the tire. The fixed marking mechanism may, for example, include a marking element that is reciprocally movable towards and away from a tire located at the marking station; movement in the marking element would be effected by a fluid pressure operated actuator.

In the preferred embodiment, in order to locate the tire at the marking station so that marking of the tire is done with precision, the distance traveled by the tire leaving the testing station is carefully monitored. To achieve the monitoring, the conveyor 300 includes an encoder to monitor the distance moved by the conveyor belts 304. The total distance traveled by the tire along the conveyor can be carefully monitored to assure the tire is precisely positioned at the marking station.

If desired, the tire testing system may include a sorting mechanism indicated schematically by the reference character 14b which is disposed downstream from the marking station 14a. The sorting station 14b includes an elevator mechanism which is used to position the tire at one of a plurality of exit positions. Each exit position may be connected to a conveyor for conveying a tire to a predetermined location based on the parameters by which the tire is being sorted. For example, the sorter mechanism may sort tires by grade and the elevator mechanism would deliver all tires of one grade to a given conveyor. Alternately, the tires may be sorted by measured characteristics so that tires having a common characteristic would be delivered by the sorter to a predetermined location.

The Loadwheel Assembly

As indicated above, the loadwheel assembly 40 including loadwheel 42 is used to measure tire uniformity. The loadwheel 42 is rotatably carried by a C-shaped carriage indicated generally by the reference character 400. The carriage mounts the upper and lower load cells 46, 48 which mount the loadwheel 42 for rotation about an axis 402 which, as viewed in FIG. 3, passes vertically through load cells 46, 48. The load cells monitor the forces applied to the loadwheel by the tire as it rotates; the angular position of the tire is also monitored by an encoder 403, thus the region of a tire that produces the detected force is determined. The tire information gathered during a test cycle may be used to characterize tires for quality control purposes and/or to perform corrective actions, such as grinding the tire to optimize tire uniformity.

The data gathering systems may be conventional, such as the systems disclosed in U.S. Pat. No. 4,805,125, entitled Apparatus And Methods For Improving Uniformity Measurements, the subject matter of which is hereby incorporated by reference.

Figure 4:
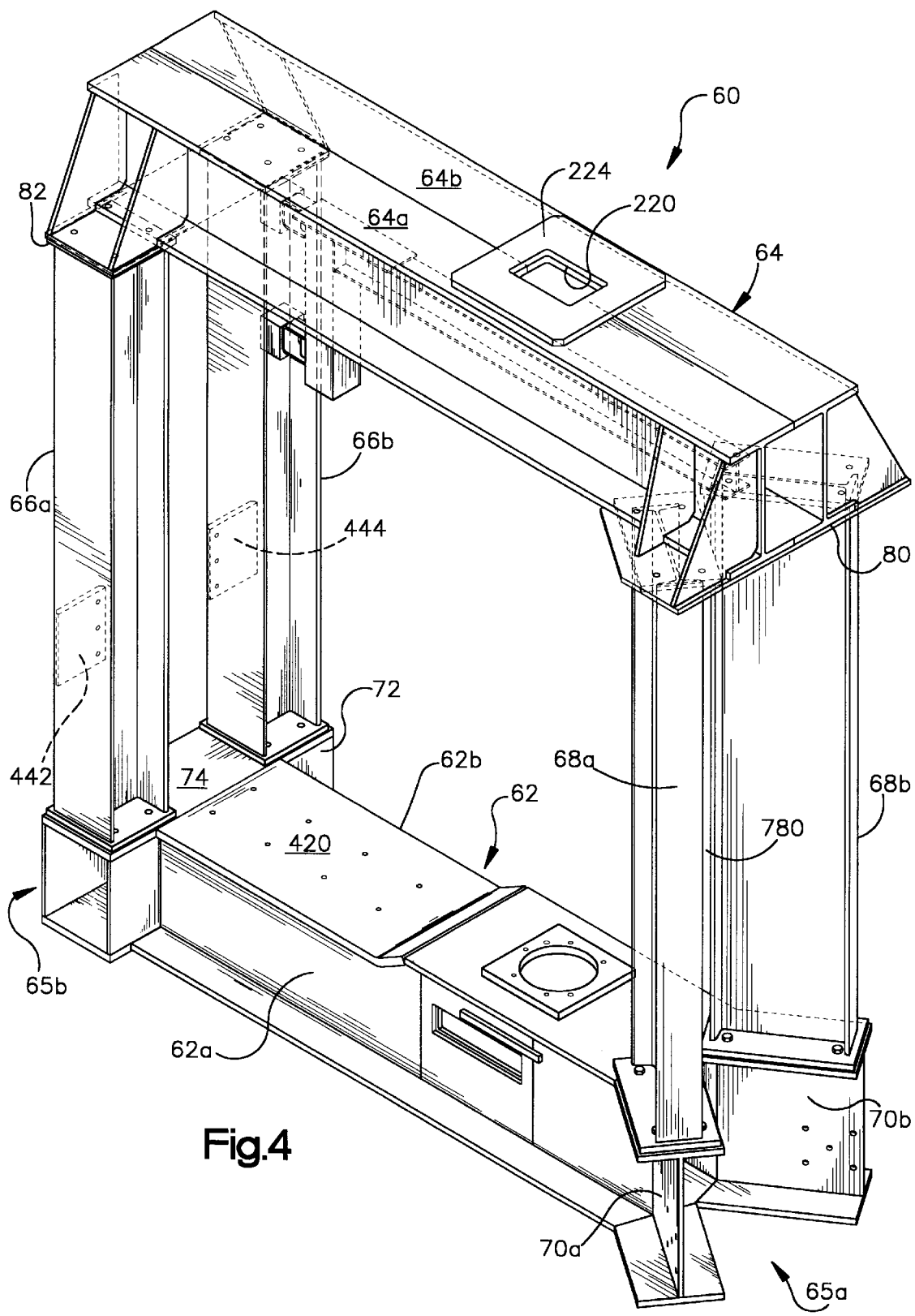
FIG. 4 is a perspective view of a frame constructed in accordance with a preferred embodiment of the invention and which forms part of the tire testing station shown in FIG. 3.

In the preferred and illustrated embodiment, the C-shaped carriage 400 is a weldment and is fabricated from steel tubing. The C-shaped carriage is mounted for lateral, reciprocating movement towards and away from the rotational axis 156 of the testing station. The path of movement for the carriage is preferably linear and defines a vector, which if extended, runs through the axes of rotation 402, 156 of both the loadwheel and the testing station. Referring in particular to FIG. 3, the loadwheel carriage 400 is supported for lateral movement by a guide assembly indicated generally by the reference character 410. In the illustrated embodiment, a conventional slide mechanism is used which includes a movable slide member 410a fastened to the bottom of the carriage and a fixed member 410b which is fastened to the base 62 of the frame 60. Referring also to FIG. 4, a mounting plate 420 which serves as a mounting for the fixed portion 410b of the slide assembly is secured to a recessed portion of the cross beam 62 so that the loadwheel is at a relatively low level and can be accessed, serviced, adjusted, etc., by an operator without the need for ladders, etc.

The carriage includes a base plate 424 to which the movable slide member 410a is attached. A similar base member 426 is fastened to the top leg of the carriage and enables the loadwheel assembly to be rotated 180° in order to orient the loadwheel carriage 400 such that the load cells 46, 48 are accessible from the opposite side of the machine, as viewed in FIG. 3. This "reversibility" enables the direction of feed for the machine to be easily changed. More specifically, as seen in FIG. 1, the direction of feed of tires to be tested is from right to left. In this configuration, it can be seen that the load cells 46, 48 can be accessed from the exit side of the test station. Equipment and other components would make it difficult, if not impossible, to access the load cells from the entrance side of the machine. If an installation requires that the tires be transported from left to right in order to accommodate existing conveyor systems at a plant site, this change in tire flow direction can be easily accommodated. The testing station 12, as seen in FIG. 1, would remain substantially unchanged. However, the inlet conveyor 10 and the marking and sorting stations 14a, 14b would be reversed. Absent the ability to reverse the loadwheel carriage 400, it would then become very difficult for the load cells to be accessed for service, replacement, etc. This difficulty is alleviated by reversing the position of the loadwheel carriage 400, such that the upper base plate 426 (as viewed in FIG. 3) would become the lower base plate to which the slide member 410a would be attached.

Movement of the loadwheel carriage 400 towards and away from the testing station is provided by a ball screw and gear box arrangement, indicated generally by the reference character 440 in FIGS. 1 and 3. The gear box is secured to the vertical I-beams 68a, 68b using mounting plates 442, 444. The ball screw which is captured by the gear box is connected at one end to the carriage 400, such that rotation of a drive gear forming part of the gear box through which the ball screw extends and is threadedly engaged, produces lateral movement in the ball screw to produce attendant movement in the loadwheel carriage 400. A suitable sensor such as a linear string pot (not shown) is used to monitor the extent of travel of the loadwheel carriage.

In the preferred method of operation, the load wheel 42 is moved into contact with the tire located at the testing station, prior to actuation of the spindle drive motor 36. In prior art uniformity testing machines, rotation of the tire in the testing station is commenced prior to contact with the load wheel. The initial contact between the rotating tire and the load wheel can produce scuffing on the tire and/or marking of the load wheel. In at least some prior art machines, a load wheel cleaner is provided for removing tire residue that accumulates on the surface of the load wheel due to the slippage that occurs between the non-rotating load wheel and rotating tire at the point of initial contact.

In the disclosed machine, scuffing between the tire and load wheel is eliminated or at least substantially reduced. In the preferred method of operation, the spindle drive motor 36 is not energized until the load wheel 42 is moved into contact with a tire 20 by the load wheel carriage drive motor 440. Once contact between the load wheel 42 and the tire 20 is established, the spindle drive motor 36 is energized to rotate the tire. In a more preferred embodiment, the spindle drive motor 36 is energized upon initial contact between the tire and load wheel 42. The load wheel carriage 400 is then further actuated by the drive motor assembly 440 until the desired load between the load wheel and tire is achieved. An example of mechanism for establishing a desired load on the tire is disclosed in U.S. Pat. No. 4,704,900, entitled "Apparatus And Method For Imposing A Desired Average Radial Force On A Tire", which is hereby incorporated by reference. Once the proper loading has been obtained, the uniformity forces on the tire are measured by the load wheel. After the completion of the test, the load wheel is retracted and disengages the tire.

The loadwheel 42 may be of conventional construction and may be a cast component that is precisely machined. Alternately, the loadwheel may comprise a fabricated component such as the loadwheel disclosed in co-pending application Ser. No. 08/988,509, filed Dec. 10, 1997, and entitled LOADWHEEL ASSEMBLY FOR TIRE TESTING SYSTEMS, the subject matter of which is hereby incorporated by reference.

The Integral Crane

Referring to FIGS. 3, 4, 4a and 6, an integral crane (indicated generally by the reference character 500 in FIG. 3) is provided to facilitate the removal, the repair and the reinstallation of the primary components of the tire testing machine. As seen best in FIGS. 3 and 4a, the crane comprises a vertical support 502 from which extends a horizontal lifting arm 504. The vertical support 502 is hingedly connected to the vertical column 66b by a pair of hinge assemblies 506. As seen best in FIG. 3, the horizontal lifting arm 504 substantially spans the distance between the vertical support columns 66, 68. In particular, a distal end 508 of the horizontal arm 504 may be positioned in close proximity to the inside flange of the vertical column 68.

Figure 4A:
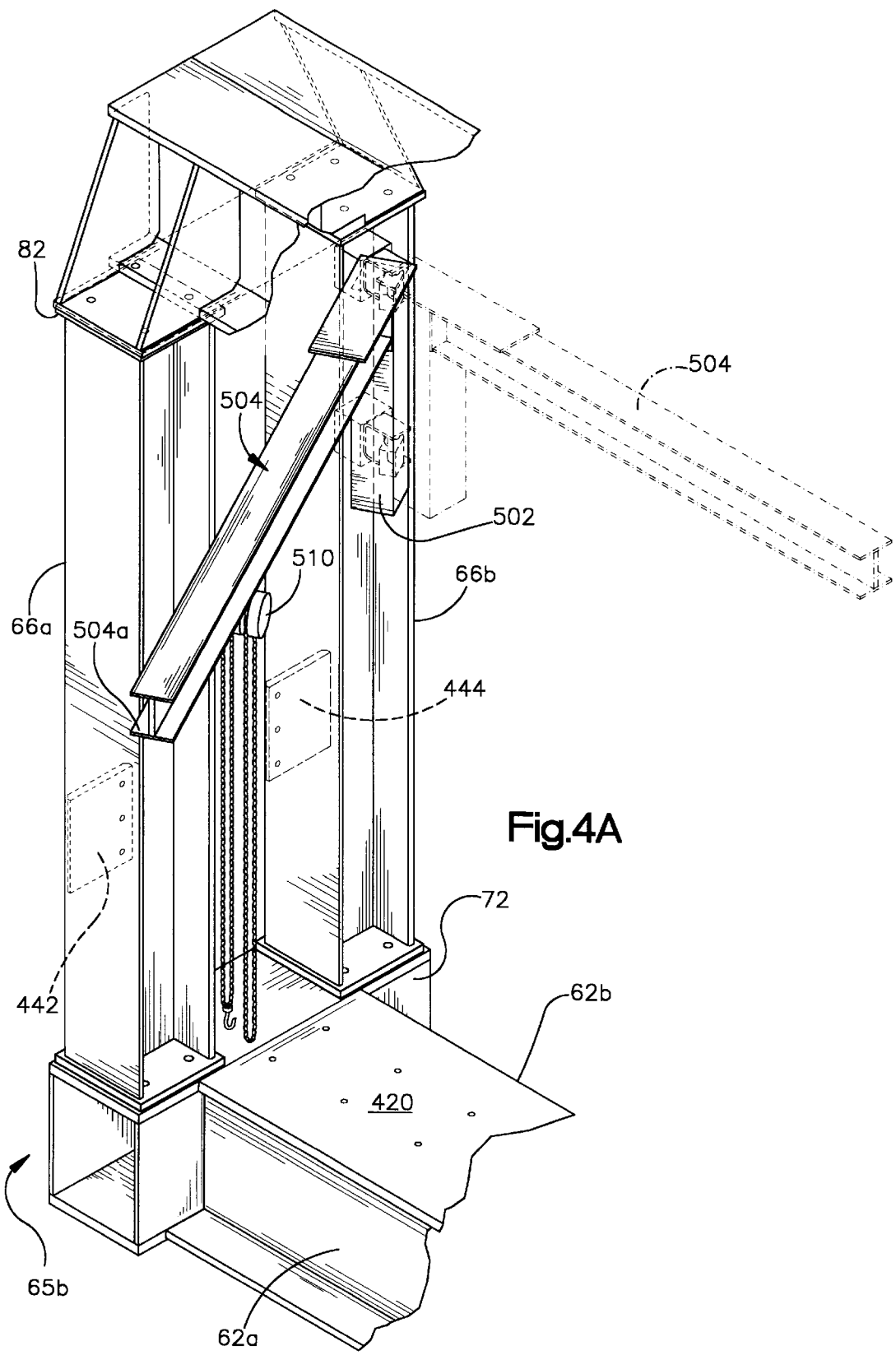
FIG. 4a is a fragmentary, perspective view of the frame structure shown in FIG. 4.

As seen best in FIG. 4a, the horizontal arm 504 comprises an I-beam which carries a lifting cable or lifting chain which is attachable to components mounted to the base 62 of the machine frame structure. In the preferred and illustrated embodiment, the horizontal beam carries a block and tackle or chain fall 510. The chain fall is slidably movable along a bottom flange 504a of the horizontal support arm 504.

In the preferred and illustrated construction, the crane facilitates the lifting and movement of machine components from their operative positions to a position spaced from the machine structure. For some operations, a transport device may be located at the remote location for receiving the components that have been lifted from the machine base 62.

Figure 6:
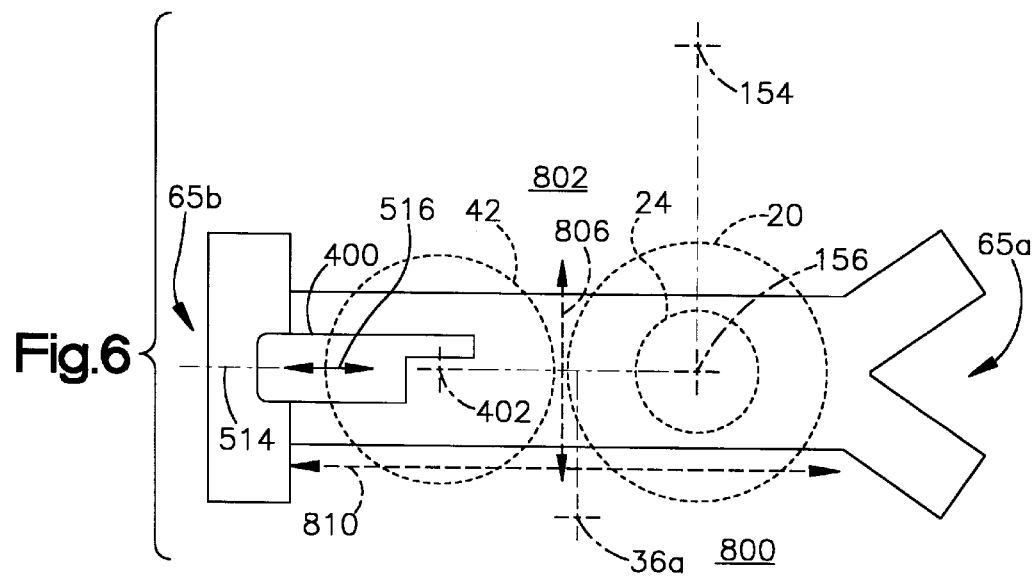
FIG. 6 is a schematic plan view showing the spatial relationship between certain machine components.

Referring to FIG. 6, the mounting locations of the components that are engageable by the crane are illustrated. In particular, the base 62 of the frame mounts the previously described spindle and chuck assembly having a rotational axis 156. The base 62 defines a longitudinal centerline 514. In the preferred embodiment, the axis of rotation 156 of the spindle and chuck assembly is located on the centerline 514.

As also seen in FIG. 6, the load wheel carriage 400 is movable radially as indicated by the arrow 516. The carriage 400 also defines the rotational axis 402 of the load wheel 42. In the preferred embodiment, the path of movement 516 of the carriage 400, as well as the rotational axis 402 of the load wheel 42, are both aligned with the longitudinal centerline 514 of the base.

Referring also to FIG. 1, the spindle drive motor 36 is mounted to one side of the longitudinal centerline 514 of the base 62. In the illustrated embodiment, and as viewed in FIG. 6, the spindle drive motor is located to the left side of the base. An axis of rotation for its drive sprocket is indicated by the reference character 36a. In a preferred and illustrated embodiment, the components engageable by the crane support arm 504 are all located on or to one side of the longitudinal centerline 514 of the base 62. With this configuration, the integral crane 500 can be used to lift all of the major subassemblies of the machine and move them to a location spaced from the base where they may serviced or placed on other transport devices to move them to a service location. Very little, if any, disassembly of the apparatus is required in order to gain access to the components requiring removal. With the disclosed arrangement, virtually all the components are easily accessible from one side of the machine and in the illustrated embodiment, are accessible from the "entrance" side of the machine. The entrance side of the machine is to the left of the centerline 514, as viewed in FIG. 6.

The Probe System

Figure 7:
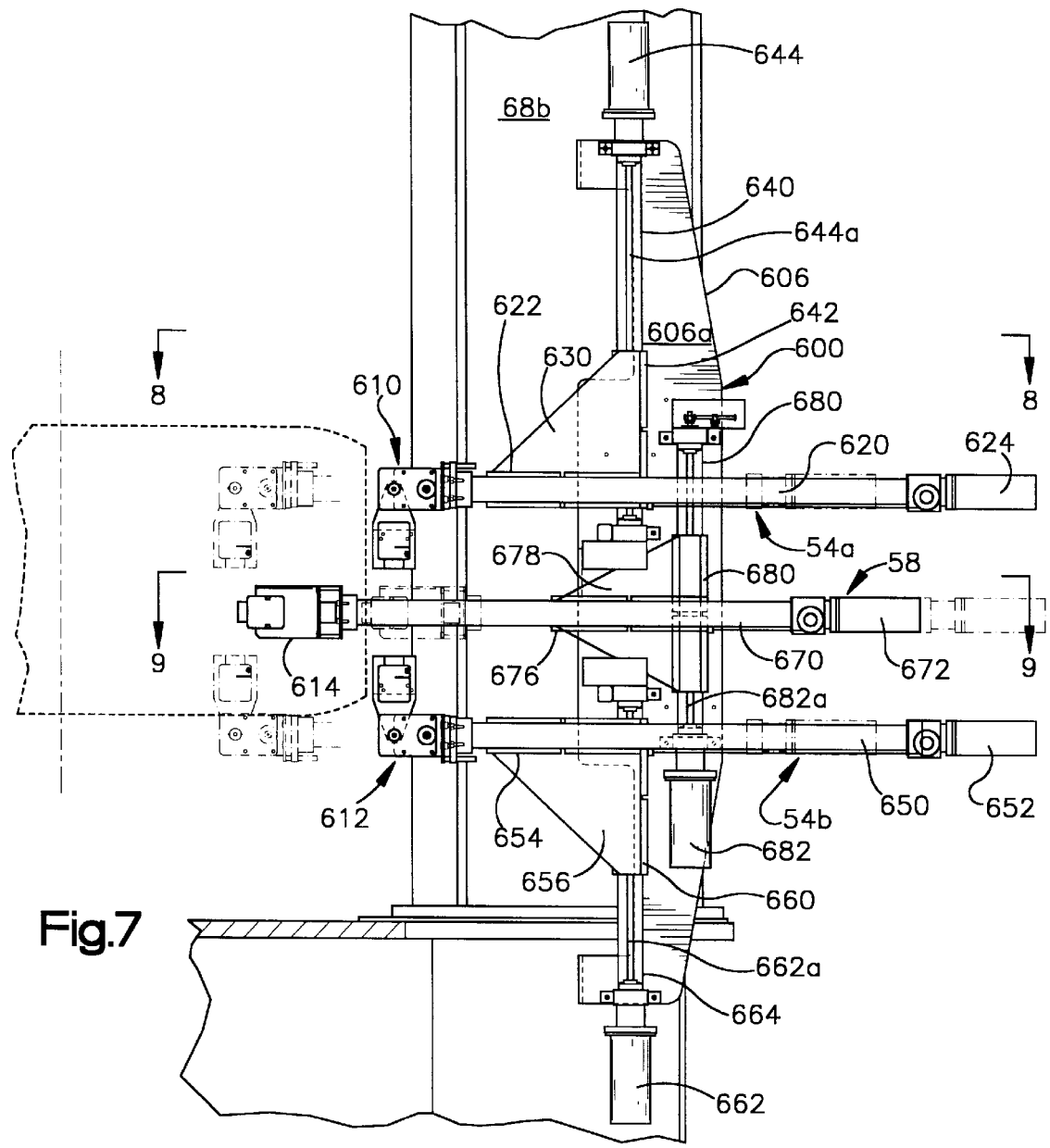
FIG. 7 is a fragmentary side elevational view of the tire testing system showing details of the probe system.
Figure 8:
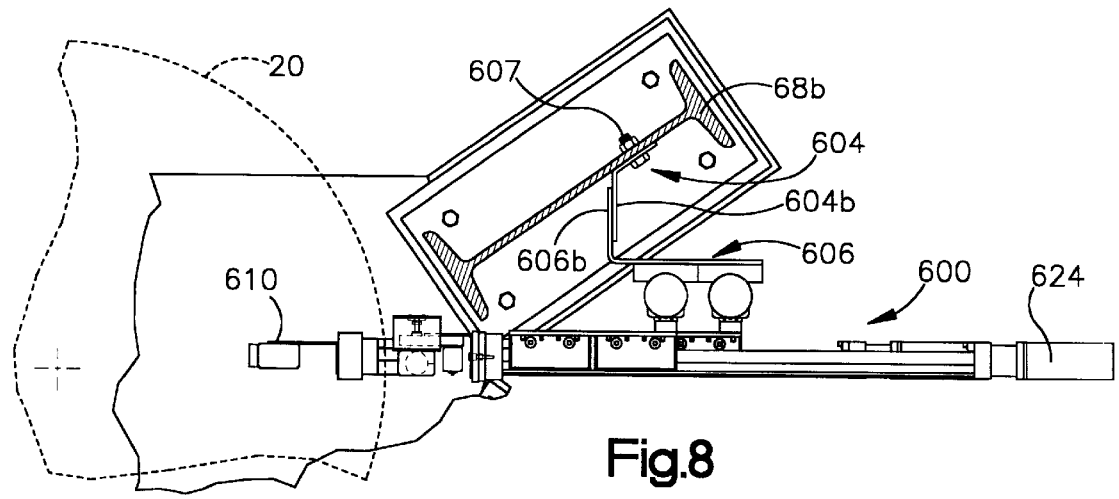
FIG. 8 is a fragmentary top view, partially in section, of the tire testing system showing details of the probe system as seen from the plane indicated by the line 8—8 in FIG. 7.
Figure 9:
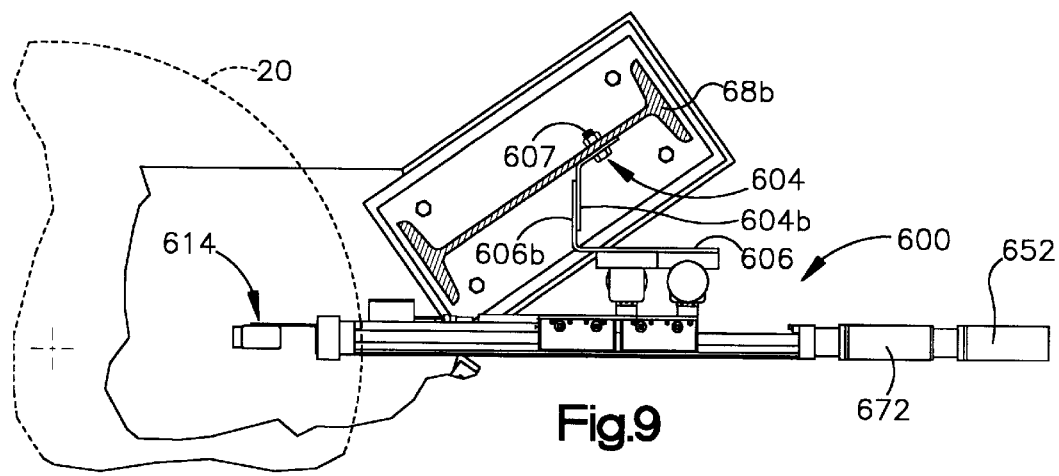
FIG. 9 is a fragmentary top view, partially in section of the tire testing system showing details of the probe system as seen from the plane indicated by the line 9—9 in FIG. 7; and, FIGS. 10–12, illustrate the construction of a tilt sensor and breakaway assembly forming part of the present invention.

Referring in particular to FIGS. 3 and 7–12, details of the probe system 56 are illustrated. In a preferred and illustrated embodiment, five probes are shown, three of which form part of a first probe subassembly 600 (shown best in FIG. 8) attached to one of the vertical I-beams, the other two of which form a part of a second probe subassembly 602 attached to the other vertical I-beam (shown best in FIG. 5). The probe subassembly 600, as seen best in FIG. 9, is rigidly attached to the vertical I-beam 68b by brackets 604 (only one is shown). In particular, the bracket 604 shown in FIG. 8, attaches an upper end of a probe support and mounting plate 606 to the I-beam (see FIGS. 7 and 8); the probes are movably mounted to the plate 606. Another bracket 604 attaches a lower end of the plate 606 to the I-beam (see FIG. 9). As seen in FIG. 8, the mounting plate 606 includes a planar portion 606a that extends longitudinally in the vertical direction and is parallel to the longitudinal extent of the I beam 68b. The mounting plate 600 includes upper and lower angle tabs 600b (see FIGS. 8 and 9) which are secured to complementally-shaped tabs 604b formed in the bracket 604. As seen in FIG. 8, the brackets 604 are bolted to the I beam 66b by fasteners 607.

The probe subassembly 600 includes upper and lower side wall probes 54a, 54b and a tread probe 58. The upper and lower side wall probes mount respective upper and lower side wall sensor assemblies 610, 612 at their distal ends, whereas the tread probe mounts a tread sensor 614. Each probe is rectilinearly moveable along two mutually orthogonal axes. In particular, each probe 54a, 54b is movable towards and away from the tire in a lateral direction i.e. in a direction perpendicular to a rotational axis of the testing station or alternatively in a direction parallel to a radial plane of the tire being tested. Each probe is also moveable in a vertical direction, i.e. in a direction parallel to the rotational axis of the testing station or alternatively in a direction perpendicular to a radial plane of the tire, being tested. As a result, the probes 54a, 54b can accommodate a wide range of tire sizes.

The tread probe 58 is also mounted to the mounting plate 606 and is rectilinearly movable along two mutually orthogonal axes. In particular, it is movable towards and away from the tread of the tire (i.e., movable along a path that is perpendicular to a rotational axis of the testing station or alternatively, along a path that is parallel to a radial plane of the tire being tested. It is also vertically movable (i.e., along a path that is parallel to the rotational axis of the testing station or alternatively along a path that is perpendicular to a radial plane of the tire, being tested.

In the preferred embodiment, each of the probes 54*a*, 54*b*, 58 include servo motor driven slide mechanisms for supporting and enabling the reciprocal movement in the probe. In the illustrated embodiment, cylinder-style screw-drive actuators are used and form the major part of the slide mechanism. These types of actuators are available from Tol-O-Matic®, which is located in Hamel, Minn. Other types of slide mechanisms are contemplated by the present invention.

The upper side wall probe 54*a* includes a housing 620 and a carrier bracket 622. A screw drive (not shown), which is operatively connected to a servo motor 624 effects movement in a housing 620 relative to the carrier bracket 622 whenever the servo motor 624 is actuated to rotate the internal screw. The direction of relative movement between the carrier bracket 622 and the housing 620 is determined by the direction of rotation of the screw. Actuation of the servo motor 624 effects movement in the upper side wall probe along a path that is parallel to a radial plane of the tire.

Vertical movement in the probe 54*a* is provided by another slide mechanism. This slide mechanism includes a housing 640 and an associated carrier bracket 642. A servo motor 644 rotates an internal screw drive 644*a* which moves the carrier bracket 644 vertically, relative to the housing 640.

The carrier bracket 622 is rigidly mounted to a triangular-shaped intermediate plate 630 which in turn is fixed to the carrier bracket 644. Thus, actuation of the servo motor 644 effects vertical movement in the intermediate plate 630 and, hence, the probe 54*a*, the direction of movement being determined by the direction of rotation of the screw drive 644*a*.

It should be noted here that in the preferred embodiment, the housing 620 and the associated servo motor 624, moves relative to its associated carrier bracket 622. In other words, the lateral position of the carrier bracket 622 does not change when the servo motor 624 is actuated. The slide mechanism for providing vertical movement in the probe, however, is mounted differently. In the case of the vertical slide, the servo motor 644 and the associated housing 640 are rigidly attached to the mounting plate 606 and its associated carrier bracket 642 moves vertically with respect to the housing 640 upon actuation of the servo motor 624. The combination of the lateral servo motor 624 and the vertical servo motor 644 enables the upper side wall sensor 610 to be precisely positioned at a predetermined location with respect to a tire side wall for virtually any size tire.

The lower side wall probe 54*b* includes a similar arrangement. In particular, lateral movement is provided by a slide mechanism that includes a housing 650, a servo motor 652 and an associated carrier bracket 654. The carrier bracket 654 is rigidly connected to an intermediate mounting plate 656 which is rigidly connected to a carrier bracket 660 forming part of a vertical slide mechanism. The vertical slide mechanism includes a servo motor 662 for rotating a screw drive 662*a* and associated housing 664. The housing 664 is rigidly attached to the mounting plate 606. In the preferred embodiment, the vertical slide mechanisms for the upper and lower side wall probes are vertically aligned, as seen best in FIG. 3 i.e. the rotational axes of the screw drives 644*a*, 662*a* are coincident.

The center tread probe 58 also includes a similar slide arrangement. In particular, the probe includes a housing 670 and an associated servo motor 672. Operation of the servo motor moves the housing relative to its associated carrier bracket 676 which is rigidly attached to a triangular shaped intermediate mounting plate 678. The intermediate mounting plate is in turn rigidly connected to a carrier bracket 680 forming part of a vertical slide mechanism. The vertical slide mechanism includes a housing 680 and associated servo motor 682 which are mounted to the mounting plate 606. Actuation of the servo motor 682 rotates a screw drive 682*a* and moves the intermediate mounting plate 678 vertically, which in turn moves the entire tread probe 58 in the vertical direction.

According to an additional feature of the invention, the vertical and lateral positions of a given probe are also monitored. In the preferred embodiment, this feature is achieved by using string pots which are connected to the relatively moving portions of the probe in order to monitor the extent of movement.

Referring in particular to FIG. 7, the center tread probe carries the tread sensor 614, which may be a proximity sensor, at a distal end of the probe housing 670. The servo motor 672 effects movement in the sensor 614 towards and away from the tire tread, along a line of action parallel to a radial plane of the tire whereas the servo motor 682 effects movement of the sensor 614 in the vertical direction. By selective actuation of the servo motors 672, 682, the tread sensor can be precisely positioned with respect to a tire located in the testing station.

The upper and lower sidewall sensors assemblies 610, 612 are precisely located with respect to a tire held in the testing station by their respective servo/slide mechanisms. The side wall sensor assemblies 610, 612 may be similar in construction to the tread sensor 614. In the preferred and illustrated embodiment, however, each side wall sensor assembly includes a tilt mechanism for adjusting the angle of the sensor with respect to the tire side wall and also a "breakaway" feature for releasing the sensor should contact with the tire occur.

Figure 12:
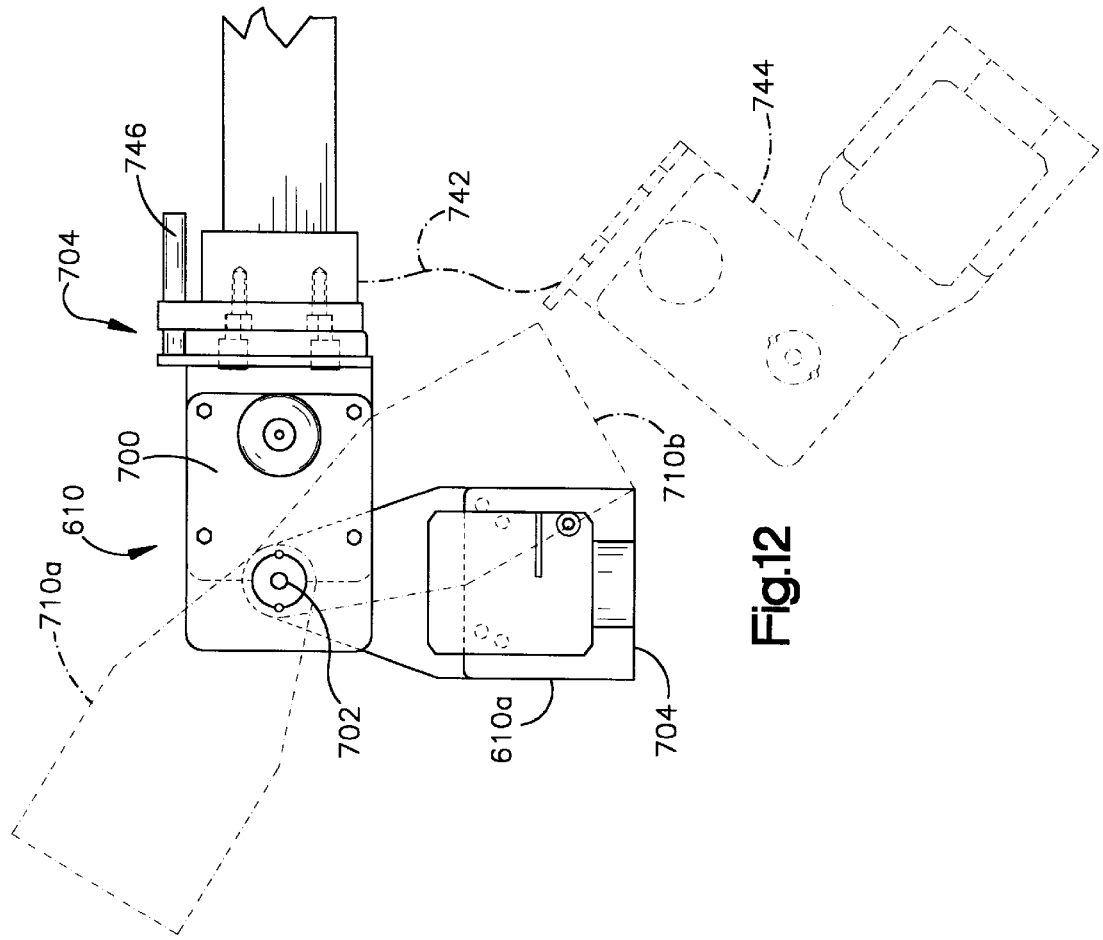
Figure 10:
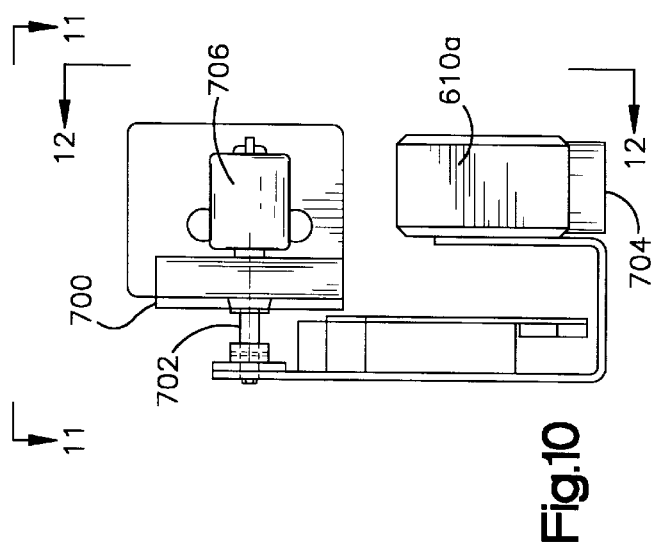
Figure 11:
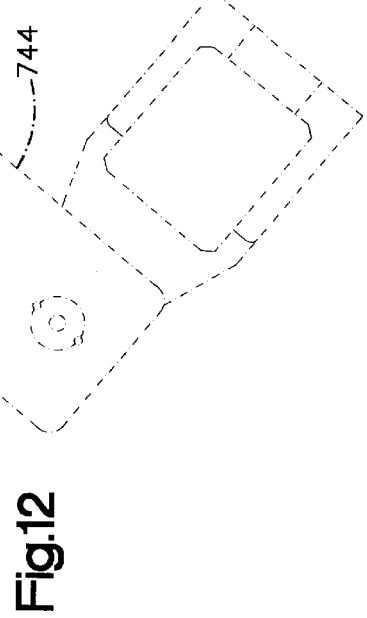

In the preferred embodiment, the upper sidewall sensor 610 is tiltable with respect to the tire sidewall. Referring to FIGS. 10–12, this is achieved using, in the preferred embodiment, an off-the-shelf timing motor and gear box assembly 700 to which a sidewall sensor 610*a* is attached.

As seen best in FIG. 12, the gear box assembly 700 extends laterally from the end of the probe 54*a*. A drive shaft 702 extends laterally from the assembly 700 and is rotatable upon actuation of a gear box drive motor 706. The side wall sensor 610*a* is attached to the drive shaft 702 and includes a sensor face 704 which is positioned by the probe's servo/slide mechanism at a predetermined distance from a side wall of the tire being tested. For precise readings, it is preferred that the sensor face 704 be parallel to the side wall surface being measured or, for curved side wall surfaces, be located tangent to the surface being monitored. The gear box/motor assembly 700 is used to adjust the angle of the sensor surface 704 with respect to the side wall of the tire. Extreme angles of movement are possible with the disclosed mechanism as indicated by the positions 710*a*, 710*b* shown in phantom. In normal operation, only slight changes in angle are contemplated.

In the preferred embodiment of the invention, the side wall sensor 610*a* incorporates within it, a tilt sensor (not specifically shown) for monitoring the tilt angle of the sensor body 610*a*. As a result, the side wall sensor 610*a* can be moved to a predetermined angle position by actuation of the gear box assembly 700 without the need for visual confirmation or measurement of the angle by the operator. It has been found that a "electrolytic tilt sensor" that is available from Spectron Glass and Electronics Incorporated, located in Hauppauge, N.Y. is suitable for this application.

The side wall sensor assemblies 610, 612 also include a breakaway feature in the event of a malfunction that causes the sensor (or probe end) to contact the tire being monitored. As seen best in FIG. 12, the sensor assembly is attached to the probe arm using a magnetic coupling indicated generally by the reference character 740. A cable 742 (indicated in phantom) permanently connects the sensor assembly 610 to the end of the probe arm, but allows it to fall away from its operative position in the event of a collision between the sensor and the tire as indicated by reference character 744. In the preferred embodiment, a sensor pin 746 is located at the end of the probe arm and detects the separation of the sensor assembly from the probe and provides appropriate signaling to the control system for the testing machine.

In the illustrated embodiment, the testing machine also includes tire shoulder sensors 760 (only one is shown, see FIG. 5) which form part of a separate subassembly 602 attached to the other vertical frame member 68a. The probe assembly 602 is substantially similar to the probe system 600 explained above. Each probe is carried by mutually orthogonal slide mechanisms which enable the probe to be moved towards and away from the center axis of the tire, as well as towards and away from a radial plane of the tire. As seen best in FIG. 5, a bracket 770 is used to mount a mounting plate 772 (which is substantially similar to the mounting plate 606) to the I-beam 68a which in turn supports the probes and their associated slide mechanisms.

In the preferred embodiment, the shoulder probes and associated slide mechanisms are virtually identical to the side wall probes and slide mechanisms illustrated in FIG. 7. Each shoulder probe includes a dual slide mechanism for providing two mutually orthogonal axes of movement. Each shoulder probe mounts a shoulder sensor assembly 776 (only one is soon), which may be similar to the side wall sensor assembly 610 and include an adjustable tilt mechanism for adjusting the angular position of the sensor with respect to a tire shoulder.

In the preferred embodiment, the probes forming part of the subassembly 600 are spatially located with respect to the probes forming part of the subassembly 602 such that the probes are arranged in an interdigitated relationship. In the preferred arrangement, as seen best in FIG. 5, all five probes are substantially vertically aligned when viewed in plan.

Figure 5:
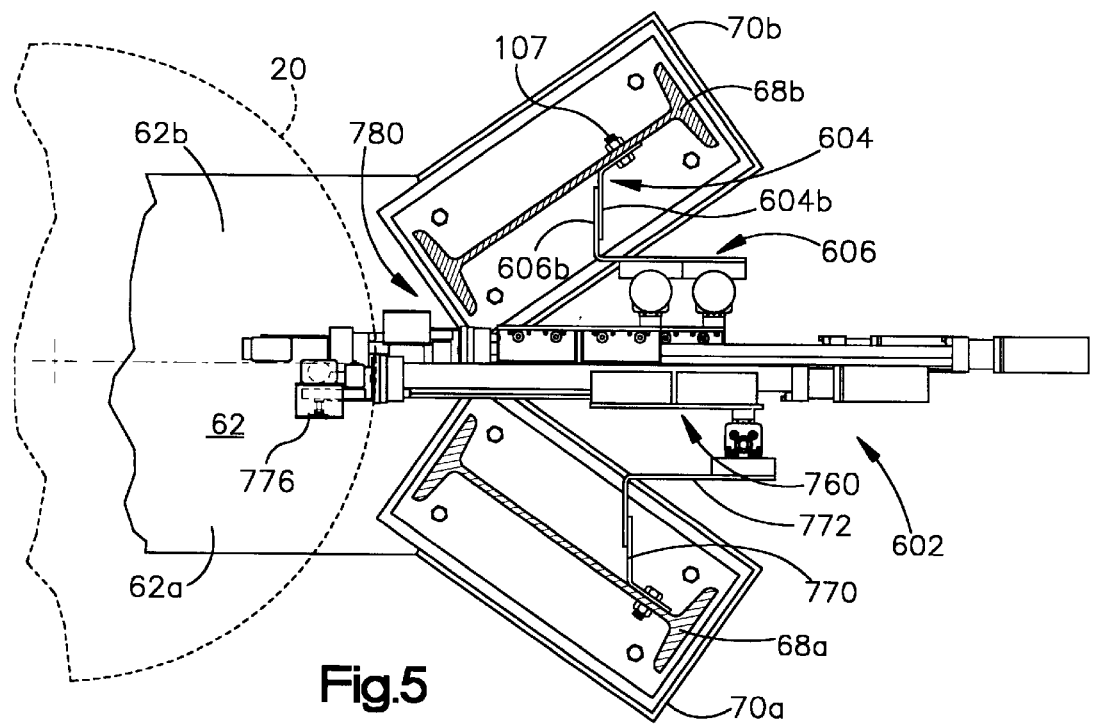
FIG. 5 is a fragmentary, sectional view as seen from the plane indicated by the line 5—5 in FIG. 3.

As seen best in FIGS. 1, 4 and 5, the sensor ends of the probes extend into the test station through a gap (indicated generally by the reference character 780 in FIGS. 4 and 5) defined between the angled, vertical support columns 68a, 68b. As seen best in FIG. 5, the major portions of the sensor assembly including, but not limited to, the servomotors, slide mechanisms, etc. are shielded from the test station by the vertical I-beams 68a, 68b. In operation, only the distal ends of the various probes are located within the test station and are exposed to contact with a tire being tested or other components within the test station. This feature combined with the magnetic breakaway by which the sensors are attached to the probe arms reduces the chance of damage to the probe system.

The probe system adds substantial versatility to the tire testing station in that the probes themselves are independently movable in two mutually orthogonal directions. This movement is achieved through servo motors under the control of the control system for the tire testing machine. By using string pots to monitor the probe positions and angle sensors to monitor the incident angle of the sidewall sensors (and shoulder sensors), closed loop control system can be easily achieved. With the appropriate control components, operator intervention is not required to change the location or to precisely position any of the probes. As a result, when tire sizes are changed, set up time to change the positioning of the probes is not required. Consequently, with the disclosed tire testing system, tires of various sizes can be fed sequentially into the machine without requiring shut-down of the system for readjustments.

The disclosed probe system has several other uses. Firstly, is can be used to measure the run out of the rims forming part of a tire chuck assembly. Additionally, it can form an integral part of the tire grinding system and eliminate the need for separate grinder probes which is often the case of the prior art arrangements. Depending on the part of the tire being modified by the grinders, the associated probe can instantly monitor the progress of the grinding procedure and can, therefore, be used to control the movement and position of the grinder, as well as the direction of rotation of the grinder elements.

The present invention contemplates use of the probe system in connection with the grinders 50, 52 so that the periphery of the tire is monitored during the grinding process. In the past, separate tread sensors associated with the grinders were often used. In addition, the slide mechanisms in the preferred embodiment enable the probes to reach the tire rims between which the tire being tested is mounted. As a result, the probe system can be used to monitor the runout of the rims.

The use of two separate probe subassemblies mounted to the vertical I-beams allows customers to specify what, in the past, would be a custom probe system. If a customer does not need all five probes, a number less that five can be specified and mounted to one of the I beams. For example, some customers only require side wall and center tread sensors and, for these customers, the second probe subassembly which normally contains the shoulder sensors, is eliminated. This modularity adds flexibility to the tire system and allows customized machine configurations to be provided without substantial expense.

Frame Footprint and Dimensional Relationship

The disclosed frame configuration and component location greatly facilitates the accessibility and, hence, the serviceability of the disclosed machine. Referring to FIG. 6, the base 62 is extremely narrow in the direction of tire movement. As viewed in FIG. 6, the bottom side of the base defines an "entrance side" 800 to the testing station, whereas, the right side of the base defines an "exit side" 802 of the machine. The distance between the entrance and exit sides is shown by the arrow 806 and for purposes of explanation is termed the "depth" of the machine. The width (the horizontal direction transverse to the "depth" dimension) of the machine opening is defined between the vertical support columns 66, 68 is indicated by the arrow 810. As should be apparent, the "depth" of the machine, unlike prior art machines, is substantially less than the width of the machine. The invention contemplates a width dimension that is at least 10% greater than the depth dimension. In the preferred and illustrated embodiment, the width dimension is substantially greater, i.e., 50% greater than the depth dimension. As stated above, with the disclosed construction, the major components of the machine are easily accessed and substantial disassembly of the components in order to gain access to major components is substantially eliminated by the frame configuration and component mounting arrangement.

The invention has been described in connection with a method and apparatus for testing unmounted tires, i.e., tires that are advanced into a testing station where they are clamped between test rims. It should be understood, however, that many of the aspects of this invention are directly applicable to tire/wheel testing machines which measure tires that are mounted to wheels or to machines that measure wheels themselves. Aspects of the invention are also applicable to manually loaded tire and tire/wheel testing machines.

Although the invention has been described with a certain degree of particularity, it should be understood that those skilled in the art can make various changes and modifications without departing from the spirit or scope of the invention as hereinafter claimed.

What is claimed is:

1. A machine for testing tires to determine parameters such as tire uniformity, comprising:
   a) a base;
   b) an upper cross frame spaced above said base;
   c) a pair of supports extending upwardly from at least one end of said base for supporting at least one end of said upper cross frame;
   d) a chuck assembly located between said base and said cross frame and including a first portion supported by said base and a second portion supported by said cross frame; and
   e) said at least one end of said base formed by a pair of elements that diverge outwardly to define a "V" configuration, the legs of the V defining mounting locations for said upwardly extending supports.

2. The machine of claim 1, wherein each of said upwardly extending supports comprises an I-beam.

3. The machine of claim 1, further including:
   a) a probe system for making dimensional measurements on a tire located in a testing station;
   b) said probe system including at least one probe having a sensor attached to a motorized positioning mechanism that is operable to move said sensor into a measuring relationship with a tire located in said testing station; and
   c) said probe system being mounted between said upwardly extending supports, such that a major portion of said sensor positioning mechanism is protected by said supports.

4. The machine of claim 3, wherein said sensor is attached to said sensor positioning mechanism by a magnetic breakaway means.

5. The machine of claim 3, including a tilt mechanism for rotating said sensor about a horizontal axis in order to adjust its tilt angle with respect to a tire located in said test station and further including a transducer responsive to gravitational force for monitoring the tilt angle of said sensor.

6. The machine of claim 5, wherein said sensor comprises an electrolytic tilt sensor.

7. A frame structure for a tire uniformity testing machine, the frame structure comprising:
   a) a machine base including at least one I-beam, a portion of said machine base forming a mounting location for a load wheel assembly and another portion of said machine base defining a mounting location for a first tire support mechanism;
   b) a cross beam spaced above said machine base and having a longitudinal extent substantially parallel to a longitudinal extent of said machine base;
   c) said cross beam defining a mounting location for a second tire support mechanism, in alignment with said first tire support mechanism; and
   d) at least two spaced apart vertical column structures for supporting said cross beam above said base, each of said vertical column structures comprising at least one I-beam extending upwardly from an end of said machine base.

8. The frame structure of claim 7, wherein each vertical column structure comprises a pair of adjacent I-beams extending upwardly from an end of said machine base.

9. The frame structure of claim 8, wherein said machine base includes a forked end configured generally in the shape of a "Y" wherein the legs of said "Y" define mounting locations for one pair of said adjacent I-beams.

10. The frame structure of claim 7, wherein said machine base comprises two I-beams arranged in a flange abutting, side-by-side relationship and said cross beam comprises a pair of adjacent, flange abutting I-beams.

11. The frame structure of claim 7, wherein said machine base comprises two I-beams arranged in a flange abutting, side-by-side relationship and said cross beam comprises a pair of adjacent, flange abutting I-beams.

12. A machine for testing tires to determine parameters such as uniformity, comprising:
   a) a frame structure including a substantially horizontal base and an upper, transverse cross beam supported above said base by at least one vertical support column;
   b) a tire testing station at least partially defined by said base and including:
      i) a chuck assembly located between said base and said cross beam and including a first chuck portion supported by said base and upper chuck portion supported by said cross beam; and
   c) a lifting crane including a lateral support arm having a lifting end movable between at least two laterally spaced apart positions, one of said positions being within said testing station that includes said base and components attached to said base and said other position being a location spaced from said base and outside said testing station; and,
   d) means for attaching said lifting end of said support arm to an object to be moved, that is located within said testing station;
   e) said lifting end of said crane support arm positionable in said testing station such that test rims forming part of said chuck assembly can be engaged and then moved to a transport device located at said second position;
   f) said machine further comprising:
      i) a load wheel;
      ii) a load wheel carriage;
      iii) a spindle
      iv) a spindle drive means; and
      v) said crane arranged such that said movable lifting arm of said crane support arm can be used to selectively lift and then move said spindle, said upper chuck portion, said spindle drive means, said load wheel, or said load wheel carriage, to a second position.

13. The machine of claim 12, wherein said spindle, chuck assembly, load wheel, load wheel carriage and spindle drive means are all located on or to one side of a longitudinal centerline of the machine base, such that lifting and moving of said spindle, chuck assembly, load wheel, load wheel carriage and spindle drive means by said crane lifting arm is facilitated.

14. The machine of claim 12, wherein said machine defines an entrance side and an exit side and said spindle, chuck assembly, load wheel, load wheel carriage and spindle drive means are all positioned such that they are all on or to one side of a transverse centerline of said machine, such that said crane support arm can be positioned to engage any one of said spindle, chuck assembly, load wheel, load wheel carriage and spindle drive means.

15. A method for operating a tire uniformity testing system, the method comprising the steps of:
   a) advancing a tire to be tested to a centering station;
   b) centering said tire by locating its rotational axis in alignment with an axis defined by said centering station, said centering station axis being a predetermined distance from a rotational axis of a testing station;
   c) advancing a conveyor having a portion extending into said centering station, said predetermined distance such that said tire is advanced to a position at which its rotational axis is substantially aligned with the rotational axis of said testing station;
   d) lowering said conveyor such that said tire is engaged by a first rotatable rim forming part of said testing station, said advancing and lowering steps being achieved without engaging said testing station;
   e) clamping said tire between said first rim and a second rim;
   f) rotating said tire at a standard speed while engaged with a loadwheel assembly; and
   g) advancing said tire from said testing station to an exit position by raising said conveyor to lift said tire from said first rim and advancing said conveyor.

16. The method of claim 15, further comprising the step of lubricating at least one bead portion of said tire while at said centering station by rotating said tire about its rotational axis while applying lubricant to the bead portion.

17. The method of claim 16, further comprising the steps of:
   a) preparing a tire at said testing station for a marking operation by orienting a region to be marked on said tire in a predetermined orientation while at said testing station; and
   b) advancing said tire from said testing station to a marking station and marking said tire by actuating a marking apparatus at said marking station that is aligned with said tire region to be marked.

18. A tire testing system comprising:
   a) a rotatable spindle assembly mounted to a base portion of a frame and operative to support a tire to be tested at a testing station;
   b) an inlet conveyor for delivering a tire to said testing station, including a conveyor portion that extends into a tire centering station and another portion that overlies said spindle assembly, said inlet conveyor being mechanically decoupled from said testing station;
   c) a chuck assembly having a rotational axis coincident with the rotational axis of said spindle assembly and mounted for reciprocating movement towards and away from said spindle assembly;
   d) a loadwheel assembly supported for reciprocating movement towards and away from a tire held in said testing station;
   e) said inlet conveyor including;
      i) means for advancing a tire from a starting position to a testing position at which said tire is aligned with said spindle assembly;
      ii) means for disengaging said tire to enable said tire to be rotated by said spindle assembly;
      iii) means for reengaging said tire; and
      iv) means for advancing said tire from said testing station after said tire is reengaged by said conveyor.

19. The tire testing system of claim 18, wherein said loadwheel assembly includes a reversible loadwheel support carriage.

20. The tire testing system of claim 19, wherein said loadwheel assembly is supported for reciprocating movement by a slide mechanism, a portion of the slide mechanism secured to a rigidizing base member forming part of a loadwheel carriage and another portion of the slide mechanism secured to said base portion of said frame.

21. The tire testing system of claim 20, wherein said carriage includes another rigidizing base portion member which enables said carriage to be reverse mounted to said base portion of said frame, said other base member serving as a rigidizing structure for said carriage.

22. The tire testing system of claim 18, wherein said frame comprises:
   a) a machine base including at least one I-beam, a portion of said machine base forming a mounting location for a loadwheel assembly and another portion of said machine base defining a mounting location for a first tire support mechanism;
   b) a cross beam spaced above said machine base and having a longitudinal extent substantially parallel to a longitudinal extent of said machine base;
   c) said cross beam defining a mounting location for a second tire support mechanism, in alignment with said first tire support mechanism; and
   d) at least two spaced apart vertical column structures for supporting said cross beam above said base.

23. A method for operating a tire uniformity machine, comprising the steps of:
   a) providing a rotatable spindle assembly in a tire testing station to which a tire to be tested is mounted;
   b) deactivating a drive means coupled to said spindle assembly;
   c) mounting a tire to be tested to said spindle assembly;
   d) advancing a non-rotating load wheel towards said tire;
   e) upon detecting contact between said load wheel and said tire, activating said drive means to produce rotation in said spindle assembly, whereby said tire is rotated;
   f) following activation of said drive means, adjusting a final position, if necessary, of said load wheel to produce a desired contact between said load wheel and said rotating tire;
   g) measuring the uniformity forces on said rotating tire; and
   h) retracting said load wheel to thereby disengage said tire.

24. A frame structure for a tire uniformity testing machine, the frame structure comprising:
   a) a machine base including at least one I-beam, a portion of said machine base forming a mounting location for a load wheel assembly and another portion of said machine base defining a mounting location for a first tire support mechanism;
   b) a cross beam spaced above said machine base and having a longitudinal extent substantially parallel to a longitudinal extent of said machine base;
   c) said cross beam defining a mounting location for a second tire support mechanism, in alignment with said first tire support mechanism; and d) at least two spaced apart vertical column structures for supporting said cross beam above said base, each vertical column structure comprising a pair of adjacent I-beams extending upwardly from an end of said machine base, said machine base including a forked end configured generally in the shape of a "Y" wherein the legs of said "Y" define mounting locations for one pair of said adjacent I-beams.

25. A tire testing system comprising:

a) a rotatable spindle assembly mounted to a base portion of a frame and operative to support a tire to be tested at a testing station;

b) an inlet conveyor for delivering a tire to said testing station, including a conveyor portion that extends into a tire centering station and another portion that overlies said spindle assembly;

c) a chuck assembly having a rotational axis coincident with the rotational axis of said spindle assembly and mounted for reciprocating movement towards and away from said spindle assembly;

d) a loadwheel assembly supported for reciprocating movement towards and away from a tire held in said testing station, said loadwheel assembly including a reversible loadwheel support carriage;

e) said loadwheel assembly being supported for reciprocating movement by a slide mechanism, a portion of the slide mechanism secured to a rigidizing base member forming part of a loadwheel carriage and another portion of the slide mechanism being secured to said base portion of said frame;

f) said carriage including another rigidizing base portion member which enables said carriage to be reverse mounted to said base portion of said frame, said other base member serving as a rigidizing structure for said carriage;

g) said inlet conveyor including;
  i) means for advancing a tire from a starting position to a testing position at which said tire is aligned with said spindle assembly;
  ii) means for disengaging said tire to enable said tire to be rotated by said spindle assembly;
  iii) means for reengaging said tire; and
  iv) means for advancing said tire from said testing station after said tire is reengaged by said conveyor.

* * * * *

UNITED STATES PATENT AND TRADEMARK OFFICE
CERTIFICATE OF CORRECTION

| | | |
|---|---|---|
| PATENT NO. | : 6,016,695 | Page 1 of 1 |
| APPLICATION NO. | : 08/988480 | |
| DATED | : January 25, 2000 | |
| INVENTOR(S) | : Dennis Allyn Reynolds et al. | |

It is certified that error appears in the above-identified patent and that said Letters Patent is hereby corrected as shown below:

Column 18, line 20, delete "11. The frame structure of claim 7, wherein said machine base comprises two I-beams arranged in a flange abutting, side-by-side relationship and said cross beam comprises a pair of adjacent, flange abutting I beams."

Signed and Sealed this

Seventh Day of September, 2010

David J. Kappos
*Director of the United States Patent and Trademark Office*